United States Patent [19]

Akesaka

[11] Patent Number: 5,296,915
[45] Date of Patent: Mar. 22, 1994

[54] METHOD AND APPARATUS FOR CONTROLLING DIRECTION OF EXCAVATING MACHINE

[75] Inventor: Toshio Akesaka, Kanagawa, Japan

[73] Assignee: Kabushiki Kaisha Iseki Kaihatsu Koki, Tokyo, Japan

[21] Appl. No.: 912,820

[22] Filed: Jul. 13, 1992

[30] Foreign Application Priority Data

Jul. 19, 1991 [JP] Japan .................................. 3-287344

[51] Int. Cl.⁵ ...................... G01B 11/27; E21B 44/00; E21D 9/06
[52] U.S. Cl. ..................................... 356/400; 175/26; 405/143; 299/1.3; 299/1.8; 356/153
[58] Field of Search ............... 356/399, 400, 401, 153; 33/1 M; 172/4, 4.5; 175/26; 405/143; 299/1.3, 1.8; 250/548

[56] References Cited

U.S. PATENT DOCUMENTS

| | | | |
|---|---|---|---|
| 4,273,468 | 6/1981 | Cyfka | 299/1.3 X |
| 4,311,411 | 1/1982 | Akesaka et al. | 405/184 |
| 4,392,744 | 7/1983 | Tatsuhama et al. | 299/1.3 X |
| 4,698,491 | 10/1987 | Lysen | 356/400 X |
| 5,052,800 | 10/1991 | Mimmack et al. | 356/400 X |
| 5,156,490 | 10/1992 | Terasawa | 299/1.3 X |

FOREIGN PATENT DOCUMENTS

| | | | |
|---|---|---|---|
| 0449581 | 10/1991 | European Pat. Off. | E21D 9/00 |
| 1906780 | 9/1969 | Fed. Rep. of Germany | E01G 3/04 |
| 51-7930 | 3/1976 | Japan . | |
| 61-47956 | 7/1986 | Japan . | |
| 2095720 | 10/1982 | United Kingdom | E21D 9/08 |

OTHER PUBLICATIONS

Patent Abstracts of Japan, vol. 6, No. 179 (p. 142)(1057) Sep. 14, 1982.

*Primary Examiner*—Robert J. Warden
*Assistant Examiner*—E. Leigh Dawson
*Attorney, Agent, or Firm*—Webb, Burden, Ziesenheim & Webb

[57] ABSTRACT

There is disclosed a method and an apparatus for easily controlling the advancing direction of an excavating machine without causing the excavating machine to largely trace in a zigzag way. The direction control is done by the steps of mounting a reflector on a head portion of a shield body so as to receive a light beam directed along an imaginary reference line, mounting a target on a tail portion of the shield body so as to receive the reflected light beam from the reflector, controlling means for correcting the direction so that the reflected light beam may be irradiated at an objective position within the target, and thereby controlling the advancing direction of the excavating machine so that a subjective portion at the front end of the head portion may follow along the reference line.

18 Claims, 5 Drawing Sheets

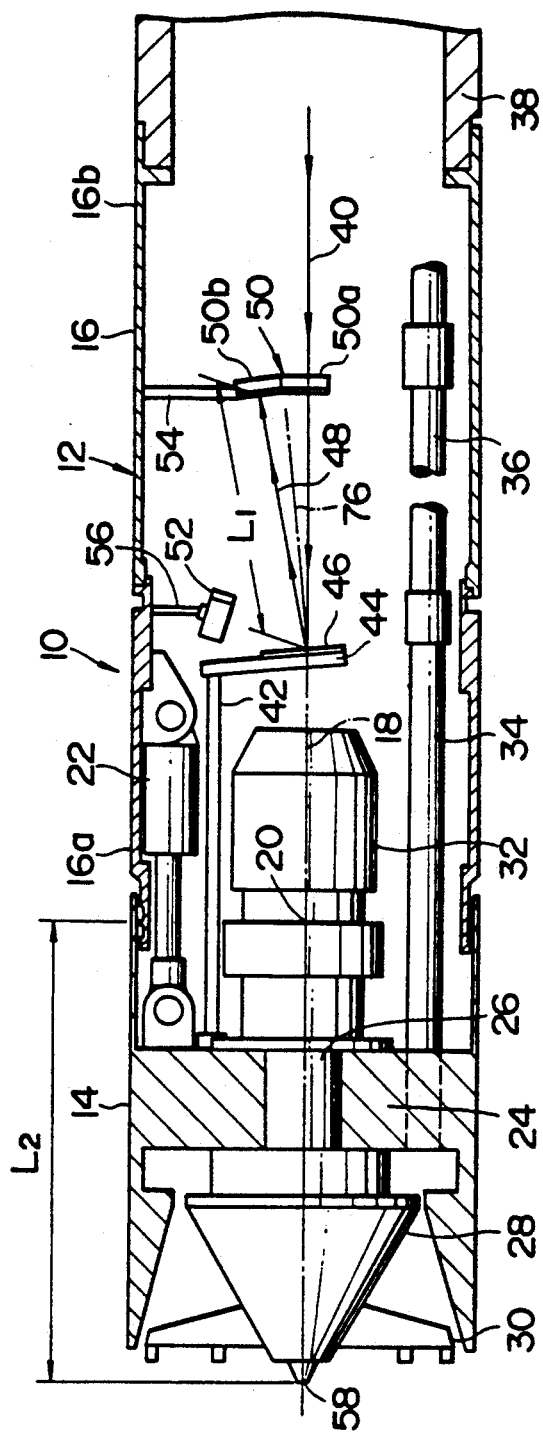
F I G. 1(A)
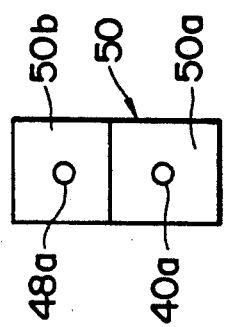
F I G. 1(B)

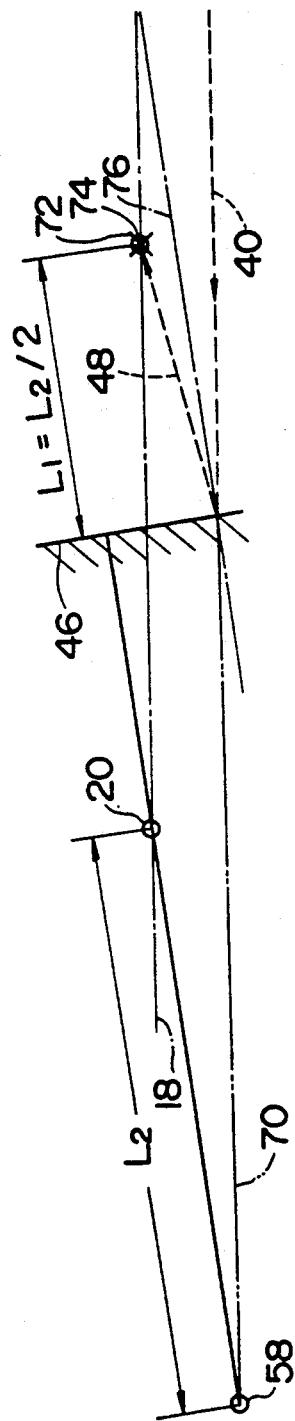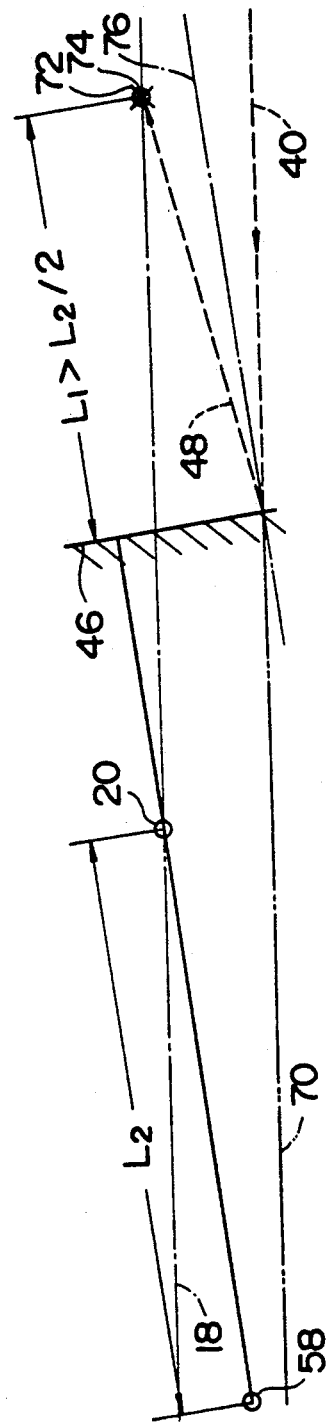

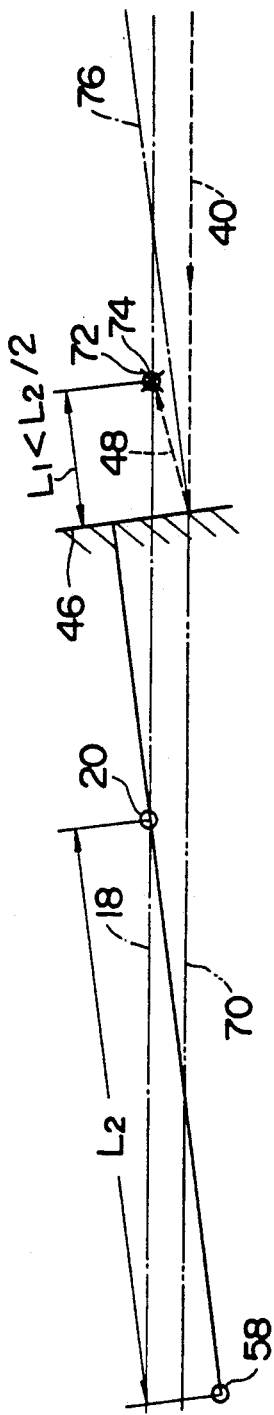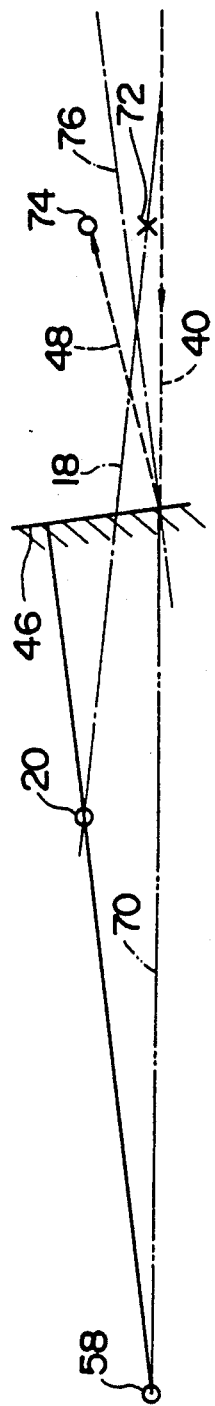

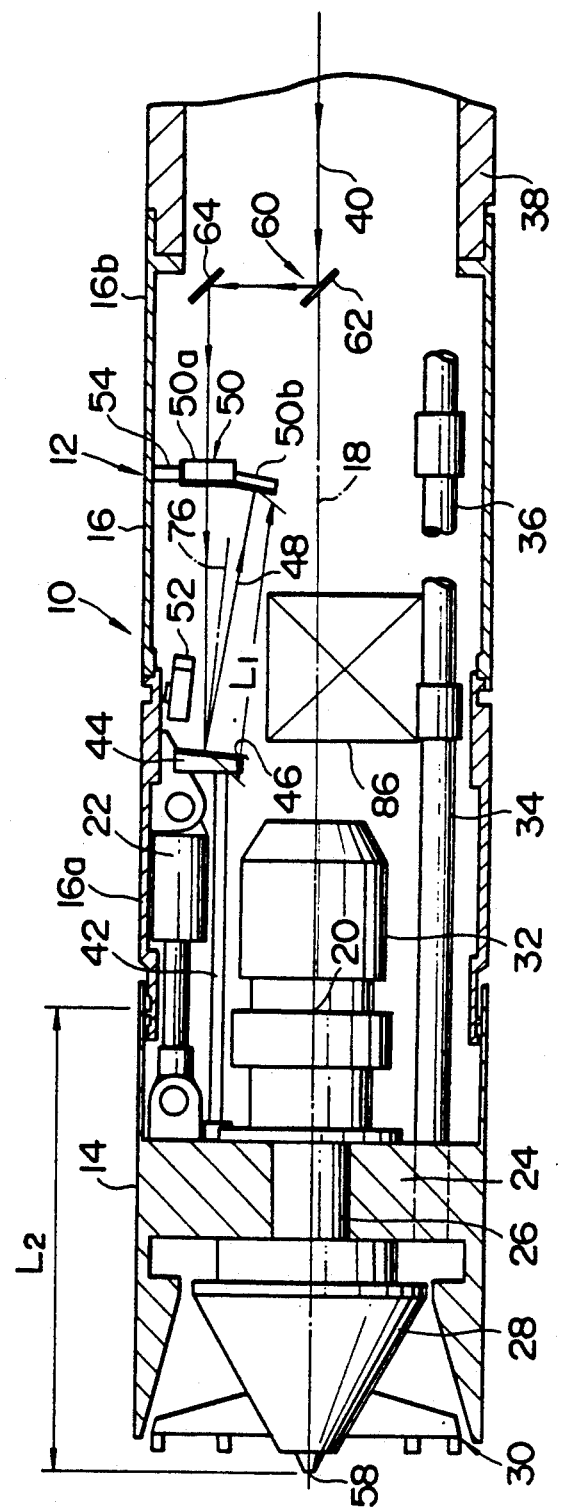

METHOD AND APPARATUS FOR CONTROLLING DIRECTION OF EXCAVATING MACHINE

BACKGROUND OF THE INVENTION

1. Field of the Invention

This invention relates to a method and an apparatus for controlling the direction of an excavating machine which uses a shield body provided with a head portion and a tail portion flexibly connected to the rear of the head portion, and more particularly, to a method and an apparatus for controlling the advancing direction of an excavating machine by use of a light beam directed along a reference line such as a planning line for a tunnel to be constructed.

2. Description of the Prior Art

In case of constructing a tunnel like a pipeline by means of a tunnel excavating machine of a shield type which uses a shield body provided with a head portion and a tail portion which are flexibly connected relatively to each other, the advancing direction of the excavating machine is corrected, that is, a so-called "directional control" is done, when the excavating machine is deviated from a planning line of a tunnel to be constructed by the excavating machine.

As one of these kinds of the methods and apparatuses for controlling the direction, a light beam such as a laser beam directed along the planning line of the tunnel to be constructed is used as a reference line for shift confirmation, and the advancing direction of the excavating machine, in particular, the direction of the head portion to the tail portion is corrected so that the light beam may be irradiated at the objective position in a target mounted on the tail portion to receive the light beam, in other words, so that the irradiating position of the beam to the target may become a predetermined place, that is, an objective position.

In this direction controlling method and apparatus known per se, the target is positioned so that a light beam may be irradiated at an objective position when both of the position and the attitude of the excavating machine relative to a planning line are in such a manner that the axis of the excavating machine corresponds to the planning line. For this reason, if the excavating machine is deviated from the planning line, the irradiating position of the beam to the target is deviated from the objective position. In this case, the advancing direction of the excavating machine is corrected so that the light beam may be irradiated at the objective position in the target in the direction controlling method and apparatus known per se.

In the direction controlling method and apparatus known per se using a light beam and a target, however, since the light beam directed along a reference line is directly irradiated to a target mounted on the tail portion, a directional correction is only made so that a target position where the target and the reference line intersect may be kept along the reference line. In such a directional control, there are many cases where the head portion is inclined against the tail portion or the reference line, even though a light beam may be irradiated at the objective position in the target, and therefore, the operation for the directional correction is complicated.

Also, in the direction controlling method and apparatus known per se as described above, the target position coincides with the reference line by shifting the top end of the head portion beyond the reference line. Therefore, the head portion is largely deviated from the reference line. Accordingly, in the direction controlling method and apparatus known per se as described above, the zigzag frequency of the head portion is not only high, but also the head portion is advanced in a zigzag way so as to largely deviate from the reference line. As a result, the excavating machine is advanced in a zigzag way so as to largely deviate from the reference line resulting in the complicated operation for the directional correction.

As one of other directional control apparatuses, either one of a dial plate and a pointer is mounted on the head portion and the other is mounted on the tail portion, respectively, the direction and the size of the bend of the head portion relative to the tail portion are confirmed on the basis of the position of the pointer on the dial plate and the advancing direction of the excavating machine, in particular, the direction of the head portion relative to the tail portion is corrected.

In the direction controlling method and apparatus known per se using the dial plate and the pointer, the direction and the size of the bend of the head portion relative to the tail portion can be confirmed. However, since it cannot be confirmed whether or not the excavating machine coincides with the reference line, the direction and the size of the bend of the head portion relative to the tail portion cannot be corrected so that the excavating machine coincides with the reference line, even if the direction and the size of the bend of the head portion relative to the tail portion may be corrected.

It can be considered that the directional control technique known per se by use of a light beam and a target and that known per se by use of a dial plate and a pointer are both used in order to correct the direction and the size of the bend of the head portion relative to the tail portion so that the excavating machine coincides with the reference line. However, since the direction and the size of the deviation of the irradiating position of the light beam to the target is independent of those of the deviation of the pointer relative to the dial plate, the directional correction has to be done by operators on the basis of mutually independent information, and the directional correction operation needs skills.

SUMMARY OF THE INVENTION

It is accordingly an object of the present invention to be able to readily control the advancing direction of an excavating machine not so as to cause the excavating machine to largely advance in a zigzag way so as to largely deviate from the reference line.

A method for controlling the direction of an excavating machine according to the present invention comprises the steps of directing a light beam to the excavating machine along an imaginary reference line from the rear of the excavating machine, receiving the light beam on a reflector mounted on a head portion of a shield body, receiving a reflected light beam from the reflector on a target mounted on a tail portion of the shield body, and controlling means for correcting the direction so that the reflected light beam may be irradiated at the objective position in the target.

An apparatus for controlling the direction of an excavating machine according to the present invention comprises a reflector mounted on a head portion of a shield body so as to receive a light beam directed to the excavating machine from the rear of the excavating machine along an imaginary reference line, and a target mounted on a tail portion of a shield body so as to receive a reflected light beam from the reflector.

As for an objective position in a target, for instance, a predetermined portion at the front end of the head portion is determined as a subjective portion which becomes an object for the directional control, and the subjective portion can be defined as an irradiating position of the reflected light beam to the target when the subjective portion is substantially positioned on the reference line.

A light beam to be standard such as a laser beam generated from a light source provided in a starting vertical shaft or the like is reflected by the reflector mounted on the head portion and then irradiated at the target mounted on the tail portion.

Both of the displacement and the displacement direction of the irradiating position of the reflected light beam to the objective position within the target are different depending on the angle of the head portion relative to the tail portion, the angle of the tail portion relative to the light beam, the angle of the head portion relative to the light beam and the displacement of the light beam from the reference line. However, the displacement direction of the irradiating position of the reflected light beam to the objective position is mainly related to the inclined direction of the head portion relative to the reference line.

Therefore, if the excavating machine is advanced by correcting the direction of the head portion relative to the tail portion so that the reflected light beam may be irradiated at the objective position, the excavating machine is always corrected in the direction where the subjective portion of the front end of the head portion coincides with the reference line and the excavating machine is advanced so that the front end of the head portion may be placed along the reference line, even in case where the excavating machine may not be placed at a right- position or in a right attitude thereof relative to the reference line. A right position and a right attitude of the excavating machine is a position where the excavating machine is properly aligned with the reference line. As a result, the excavating machine is advanced while receiving the correction by which the excavating machine is set at a right position and in a right attitude thereof relative to the reference line.

According to the present invention, since the light beam to be standard is reflected by the reflector mounted on the head portion and then irradiated at the target mounted on the tail portion, the advancing direction of the excavating machine can be controlled by controlling the means for correcting the direction so that the irradiating position of the reflected light beam to the target may be the objective position in the target, and therefore, the directional control is easy.

As the directional control can be made so that the front end of the excavating machine may be placed along the reference line, the zigzag frequency of the head portion is few and the deviating range from the reference line of the head portion is small, in comparison with those of the technique known per se in which the direction is corrected so that the target position where the target and the reference line intersect may be positioned along the reference line. As a result, the zigzag frequency of the excavating machine becomes lower and the deviating range from the reference line of the excavating machine becomes small.

The objective position within the target may be any arbitrary places so long as it is an irradiating position of the reflected light beam when the subjective portion is substantially placed on the reference line. In other words, the subjective portion may be also any arbitrary places available on the reference line, when the reflected light beam is irradiated at the objective position.

However, the objective position within the target is preferably the irradiating position of the reflected light beam to the target when the excavating machine is placed at a right position and in a right attitude relative to the reference line. By so doing, since the subjective portion becomes a portion on the reference line when the excavating machine is placed at a right position and in a right attitude relative to the reference line, the zigzag frequency of the head portion becomes lower, and the deviating range from the reference line of the head portion becomes smaller. As a result, the excavating machine can substantially be advanced straight.

It is preferable that the apparatus further comprises a deflector for causing a light beam direction along the reference line to direct along an optical path shifted from the reference line and to the reflector. This enables the light beam to avoid a hindrance or obstruction within the shield body, even though a light beam directed on the axis of the tail portion may be used.

Instead of the deflector, it is more preferable that the apparatus further comprises such a deflector that can deflect the light beam directed along the reference line to the outside in the radial direction of the shield body, cause the deflected light beam to direct the reflector, cause the reflected light beam from the reflector to direct to the center in the radial direction of the shield body, and cause the beam directed to the center in the radial direction to direct to the target. This enables the light beam to avoid from receiving any influences of the hindrance within the shield body and to shorten the distance from the front end of the head portion to the reflector, resulting in the enhancement of the precision in the directional control.

It is preferable that the target is provided with a semitransparent light-transmitting portion for permitting the passage of the light beam directed to the reflector and a light-receiving portion for receiving the reflected light beam from the reflector. This enables an operation to know the displacement of the excavating machine relative to the light beam, in particular, that of the tail portion thereto on the basis of the irradiating position of the light beam to the light-transmitting portion and the irradiating position of the reflected light beam to the light-receiving portion.

Furthermore, a television camera for taking a picture of the neighborhood of the target may be provided to monitor the image.

It is preferable to mount the target at the position where the distance from the reflector to the objective position corresponds to at least one half of the distance from the intersection of the reference line with the front end of the excavating machine to the center of motion of the head portion with respect to the tail portion when the excavating machine is placed at a right position and in a right attitude relative to the reference line. In this manner, the advancing direction of the excavating machine can be easily controlled so that the subjective portion determined at the front end of the excavating machine may not shift beyond the reference line. Therefore, the zigzag frequency of the excavating machine remarkably decreases and the deviating range from the reference line of the excavating machine becomes remarkably small, in comparison with those of the direction controlling method and apparatus known per se.

It is preferable to set the distance from the reflector to the objective position as the distance corresponding to one half of the distance from the intersection of the reference line with the front end of the excavating machine to the center of motion of the head portion with respect to the tail portion when the excavating machine is placed at a right position and in a right attitude relative to the reference line. Accordingly, the deviating range from the reference line of the excavating machine can be made smaller.

BRIEF DESCRIPTION OF THE DRAWINGS

The foregoing and other objects and features of the invention will become apparent from the following description of preferred embodiments of the invention with reference to the accompanying drawings, in which:

FIGS. 1A and 1B are a sectional view showing an excavating machine mounted with a direction controlling apparatus as a preferred embodiment of the present invention and a view showing an irradiating position of a light beam to a target, respectively;

FIGS. 2A through 2D are explanatory views showing a principle of a directional correction method according to the present invention, respectively;

FIG. 3 is a sectional view showing an excavating machine mounted with another direction controlling apparatus as a preferred embodiment of the present invention.

DETAILED DESCRIPTION OF THE PREFERRED EMBODIMENTS

Figure 4:
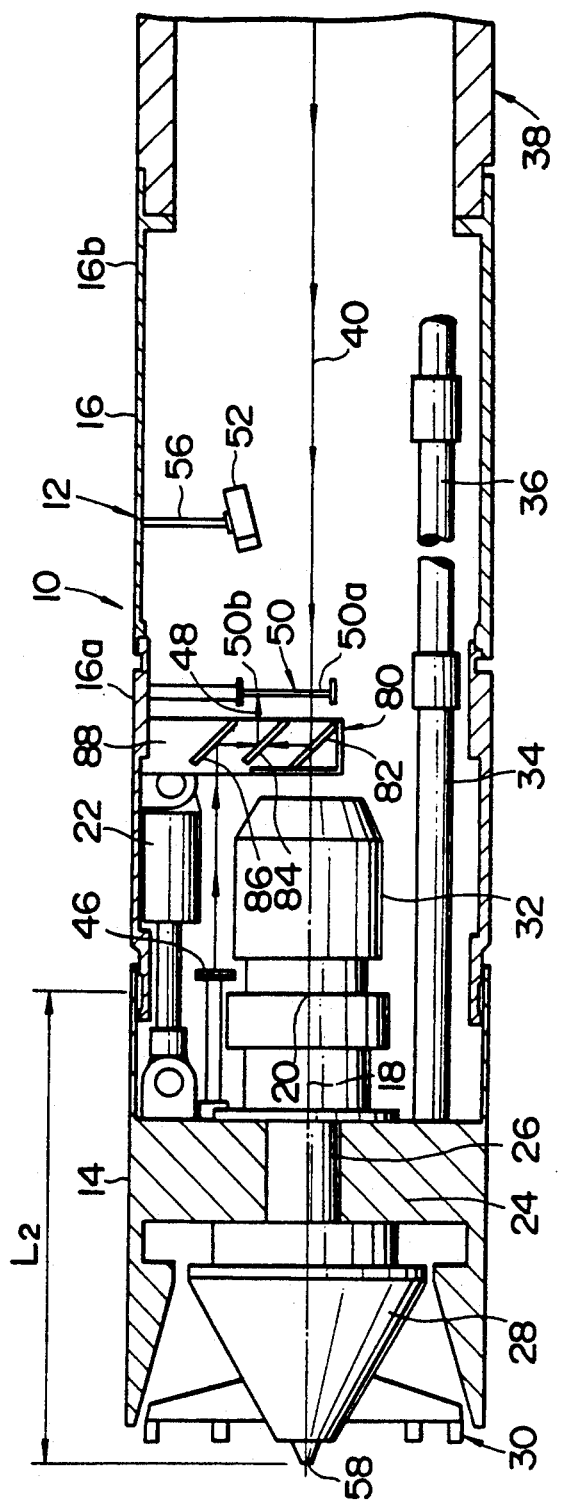
FIG. 4 is a sectional view showing an excavating machine mounted with a further direction controlling apparatus as a preferred embodiment of the present invention.

Referring now to FIG. 1(A), a shield tunnel excavating machine 10 comprises a cylindrical shield body 12. The shield body 12 is provided with a head portion 14 and a tail portion 16 continuing to the rear portion of the head portion 14. Both of the head portion 14 and the tail portion 16 are flexibly combined with each other as being centered on a center point 20 of motion of the head portion 14 with respect to the tail portion 16 on an axis 18 of the machine 10 (virtually the tail portion 16), and also connected to each other by means of a plurality of directional correcting jacks 22 for correcting the direction of the head portion relative to the tail portion 16.

The head portion 14 flexibly receives a front end of the tail portion 16 into a rear end of the head portion 14. The tail portion 16 is divided into a plurality of cylindrical bodies 16a and 16b connected to each other by a plurality of bolts separably and relatively indisplaceably. In a similar way, the head portion 14 may also be divided into a plurality of cylindrical bodies connected to each other by a plurality of bolts separably and relatively indisplaceably.

The space within the head portion 14 is divided by a partition wall 24 into a front area and a rear area. A crankshaft 26 is rotatably supported to the partition wall 24 around the axis 18. The crankshaft 26 is arranged so that an eccentric portion thereof may be located in the front area. A rotor 28 is rotatably supported to the eccentric portion of the crankshaft 26, and a cutter assembly 30 is mounted on the rotor 28. It is well-known that the cutter assembly 30 is provided with a plurality of arms extending from the rotor 28 to the outside in a radial direction thereof and a plurality of cutter bits mounted on the top ends of the arms.

The partition wall 24 is also mounted with a rotary mechanism 32 which allows the crankshaft 26 to rotate. The rotor 28 and the cutter assembly 30 are constituted so as to make a turning motion (revolution motion) centered around the axis 18 and a rotating motion (rotation motion) centered around the eccentric portion of the crankshaft 26 by the rotation of the crankshaft 26. Such a constitution is a technique known per se and disclosed in Japanese Patent Public Disclosure (KOKAI) No. 63-189596 and details thereof are omitted because they are not directly related to the directional control.

Muddy water for exhausting excavated substance is supplied in the front area of the head portion 14 through a water supply pipe 34 from the ground side. The muddy water supplied in the front area of the head portion 14 is exhausted together with the excavated substance to the ground side through an exhaust pipe 36. The water supply pipe 34 and the exhaust pipe 36 are extended to the ground through the tail portion 16, a pipe 38 to be laid such as a concrete pipe and a starting vertical shaft (not shown).

A direction controlling apparatus utilizes a light beam 40 such a laser beam as generated from a light source provided in the starting vertical shaft. In an illustrated embodiment, a planning line (virtually a pipeline in the illustrated embodiment) for a tunnel to be constructed is used as a reference line, and the light beam 40 is directed to the planning line, that is, to the reference line. However, an imaginary line in parallel with the planning line may be used as a reference line, and the light beam 40 may also be directed in parallel with the planning line.

The direction controlling apparatus comprises an arm 42 extending from the partition wall 24 to the inside of the tail portion 16, a bracket 44 mounted on the rear end portion of the arm 42, a reflector 46 mounted on the bracket 44 so as to receive the light beam 40, a target 50 mounted on the tail portion 16 so as to receive a reflected light beam 48 from the reflector 46 and a television camera 52 for taking a picture of the target.

The reflector 46 is a plane mirror in the illustrated embodiment, but it may be concave mirror having a large radius of the curvature. The reflector 46 is arranged so that the center may be provided on the axis 18 and the reflecting surface may be inclined with a predetermined angle against the axis 18.

The target 50 is mounted on a bracket 54 attached to the tail portion 16. The target 50 has a semitransparent portion 50a for allowing the light beam 40 directed to the reflector 46 to pass therethrough, and a light-receiving portion 50b for receiving the reflected light beam 48 from the reflector 46. For this reason, as shown in FIG. 1(B), the target 50 has a light spot 40a formed by the irradiation of the light beam 40 at the semitransparent portion 50a and a light spot 48a also formed by the irradiation of the reflected light beam 48 at the light-receiving portion 50b, respectively.

The television camera 52 is mounted on the tail portion 16 by a bracket 56 so as to take a picture of the overall target 50 from the front, and the resulting output signals are transmitted through a cable (not shown) to a monitor provided on the ground. Consequently, the irradiating position of the light beam to the target 50 can be confirmed on the monitor provided on the ground.

In case where the excavating machine 10 is provided with a gauge for indicating a pressure applying on the jack 22, a gauge for indicating the expansion amount of the jack 22, and a gauge for indicating a pressure within the front area of the shield body 12, these gauges are disposed in the neighborhood of the target 50, and the image of the indication portion of these gauges may be picked up by the television camera 52 together with the image of the target 50.

If the excavating machine 10 is placed at a right position and in a right attitude relative to the reference line, the light beam 40 is directed to the axis 18, passes through a predetermined portion of the transparent portion 50a of the target 50 and reaches the reflector 46, and the reflected light beam 48 is irradiated at a predetermined portion of the light-receiving portion 50b of the target 50. The irradiating position of the reflected light beam 48 to the target 50 is an objective position 72 (refer to FIG. 2) for the directional control, and an intersection portion of the top end of the excavating machine 10 with the reference line is a subjective portion 58 to be an object of the directional control.

In the illustrated embodiment, the subjective portion 58 is an intersection portion of the top end of the head portion 14 with the reference line. Consequently, the subjective portion 58 becomes a center in the front end of the head portion 14 in case where the light beam 40 is directed to the reference line and the axis 18 of the excavating machine 10 coincides with the reference line. The subjective portion 58 may, however, be another portion.

When the excavating machine 10 is placed at a right position and in a right attitude relative to the reference line, the target 50 is arranged so that a distance L1 between the reflector 46 in a direction parallel with a line 76 orthogonal to a light irradiating portion of the reflector 44 and the objective position 72 may be not less than one half of a distance L2 between the subjective portion 58 and the center point 20 of the bend. However, the reflector 46 may be arranged so that the distance L1 may be less than one half of the distance L2 as will be described later in detail.

The excavating machine 10 is advanced by a thrusting mechanism disposed in the starting vertical shaft under the condition that the rotor 28 and the cutter assembly 30 are rotated by the rotary mechanism 32 during excavation. At this time, the reflected light beam 48 is irradiated at a position of the light-receiving portion 50b in accordance with the position and the attitude of the excavating machine 10 relative to the reference line. For this reason, the operator controls the jack 22 so that the reflected light beam 48 may be irradiated at the objective position. By so doing, the excavating machine 10 is controlled so as to advance at a right position and in a right attitude relative to the reference line.

Referring now to FIG. 2, a control method by the direction controlling apparatus in the advancing direction of the excavating machine 10 will be explained.

FIG. 2 shows a case where the subjective portion 58 is an intersection portion of the front end of the head portion 14 with a reference line 70, the light beam 40 is directed to the reference line 70, and the objective position 72 of a light-receiving portion 56b is available on the axis 18. FIGS. 2(A), 2(B) and 2(C) show a case where the axis 18 is in parallel with the reference line 70, respectively, but FIG. 2(D) shows a case where the axis 18 is inclined against the reference line 70. In addition, FIGS. 2(A), 2(B) and 2(C) show a case where the distance L1 between the reflector 46 and the objective position 72 in the direction of a line 76 perpendicularly to the light-irradiating portion of a reflector 44 (the direction for connecting the subjective portion 58 to the center point 20 of motion of the head portion 14 with respect to the tail portion 16 in the illustrated embodiment) is one half of the distance L2 between the subjective portion 58 and the center point 20 of motion of the head portion 14 with respect to the tail portion 16, more than one half of the distance L2 and less than one half of the distance L2, respectively. Furthermore, FIG. 2(D) shows a case where the distance L1 is one half of the distance L2.

In case where the distance L1 is one half of the distance L2 as shown in FIG. 2(A) and when the irradiating position 74 of the reflected light beam 48 to the target coincides with the objective position 72, the subjective portion 58 is available on the reference line 70, even though the head portion may be inclined to the tail portion. If the excavating machine is advanced under this condition without correcting any directions of the head portion to the tail portion, the excavating machine is gradually shifted to the direction where the axis 18 thereof approaches the reference line 70. However, the subjective portion 58 gradually shifts downwards from the reference line 70, and the irradiating position 74 gradually shifts upwards from the objective position 72.

For this reason, in case of showing in FIG. 2(A), the excavating machine is advanced while correcting the direction of the head portion to the tail portion or after any corrections are made, in order to angularly rotate the head portion in the direction of making it direct more upwards than that at the present time to the tail portion (clockwise in the figure), not so as to cause the irradiating position 74 to shift upwards from the objective position 72 or so as to cause the irradiating position 74 to approach the objective position 72. Accordingly, the excavating machine is gradually corrected at a right position and in a right attitude where the axis 18 coincides with the reference line 70, the subjective portion 58 coincides with the reference line 70, and the head portion is not inclined to the tail portion.

In case where the distance L1 exceeds one half of the distance L2 as shown in FIG. 2(B) and if the irradiating position 74 of the reflected light beam 48 to the target coincides with the objective position 72, the subjective portion 58 is available above the reference line 70, even though the head portion may be inclined to the tail portion. When the excavating machine is advanced without correcting any directions of the head portion to the tail portion under this condition, the excavating machine is gradually shifted to the direction where the axis 18 approaches the reference line 70, and the subjective portion 58 gradually approaches the reference line 70. However, the irradiating position 74 gradually shifts upwards from the objective position 72.

For this reason, in case of showing in FIG. 2(B), the excavating machine is advanced while correcting the direction of the head portion to the tail portion or after any corrections are made, in order to angularly rotate the head portion in the direction of making it direct more upwards than that at the present time to the tail portion (clockwise in the figure), not so as to cause the irradiating position 74 to shift upwards from the objective position 72 or so as to cause the irradiating position 74 to approach the objective position 72. Accordingly, the excavating machine is gradually corrected at a right position and in a right attitude where the axis 18 coincides with the reference line 70, the subjective portion 58 coincides with the reference line 70, and the head portion is not inclined to the tail portion.

In case where the distance L1 is less than one half of the distance L2 as shown in FIG. 2(C) and even if the irradiating position 74 of the reflected light beam 48 to the target coincides with the objective position 72, the subjective portion 58 is sometimes below the reference line 70, since the head portion is inclined to the tail portion. If the excavating machine is advanced without correcting any directions of the head portion to the tail portion under this condition, the excavating machine is gradually shifted to the direction where the axis 18 approaches the reference line 70. However, the subjective portion 58 gradually shifts downwards from the reference line 70, and the irradiating position 74 gradually shifts upwards from the objective position 72.

For this reason, in case of showing in FIG. 2(C), the excavating machine is advanced while correcting the direction of the head portion to the tail portion or after any corrections are made, in order to angularly rotate the head portion in the direction of making it direct more upwards than that at the present time to the tail portion (clockwise in the figure), not so as to cause the irradiating position 74 to shift upwards from the objective position 72 or so as to cause the irradiating position 74 to approach the objective position 72. Accordingly, the excavating machine is gradually corrected at a right position and in a right attitude where the axis 18 coincides with the reference line 70, the subjective portion 58 coincides with the reference line 70, and the head portion is not inclined to the tail portion.

In case where the head portion is inclined to the tail portion and the axis 18 is also inclined to the reference line 70, as shown in FIG. 2(D), the irradiating position 74 of the reflected light beam 48 to the target does not coincide with the objective position 72. In this case, the displacement direction of the irradiating position to the objective position is different depending on the direction and the size of inclination of the head portion to the tail portion and the direction and the size of inclination of the axis 18 to the reference line 70. (In the illustrated embodiment, the direction is upwards.)

If the excavating machine is advanced under the condition shown in FIG. 2(D) without correcting any directions of the head portion to the tail portion, the excavating machine is gradually shifted to the direction where the axis 18 coincides with the reference line 70, and the irradiating position 74 apparently approaches the objective position 72.

In case of doing an actual control, however, nothing is known with respect to the direction and the size of the inclination of the head portion to the tail portion as well as the direction and the size of the inclination of the axis 18 to the reference line 70.

For this reason, in case of showing in FIG. 2(D), the excavating machine is advanced while correcting the direction of the head portion to the tail portion or after any corrections are made, in order to angularly rotate the head portion in the direction of making it direct more upwards than that at the present time to the tail portion (clockwise in the figure), so as to cause the irradiating position 74 to approach to the objective position 72. Accordingly, the excavating machine is gradually corrected at a right position and in a right attitude where the axis 18 coincides with the reference line 70, the subjective portion 58 coincides with the reference line 70, and the head portion is not inclined to the tail portion.

As described above, a directional correction in the present invention can, for example, be done in the following.

When the irradiating position 74 is shifted upwards above the objective position 72, the excavating machine is advanced while correcting the direction of the head portion to the tail portion or after any corrections are made, in order to angularly rotate the head portion in the direction of making it direct more upwards than that at the present time to the tail portion (clockwise in the figure), so as to cause the irradiating position 74 to approach the objective position 72.

When the irradiating position 74 is shifted downwards below the objective position 72, the excavating machine is advanced while correcting the direction of the head portion to the tail portion or after any corrections are made, in order to angularly rotate the head portion in the direction of making it direct more downwards than that at the present time to the tail portion (counterclockwise in the figure), so as to cause the irradiating position 74 to approach the objective position 72.

When the irradiating position 74 coincides with the objective position 72, the excavating machine is advanced while correcting the direction of the head portion to the tail portion or after any corrections are made, in order to angularly rotate the head portion in the direction of making it direct more upwards or downwards than that at the present time to the tail portion (clockwise in the figure), not so as to cause the irradiating position 74 to change from the objective position 72.

In any case, the excavating machine is gradually corrected at a right position and in a right attitude where the axis 18 coincides with the reference line 70, the subjective portion 58 coincides with the reference line 70, and the head portion is not inclined to the tail portion. Such a correcting operation may be done manually or by an automatic control apparatus.

Even in either case of the distance L1 to the distance L2, even though the inclined direction of the head portion to the tail portion may be another direction, the axis 18 may be inclined to the reference line 70 and the irradiating position 74 may be shifted to the objective position 72, each control correction can be done by correcting the direction of the head portion to the tail portion by means of a jack for correcting the direction such that the irradiating position 74 coincides with the objective position 72.

In case where the distance L1 is more than one half of the distance L2 under the condition shown in FIG. 2, the subjective portion 58 does not exceed the reference line 70, even though the irradiating position 74 coincides with the objective position 72. On the other hand, in case where the distance L1 is less than one half of the distance L2, the subjective portion 58 has already exceeded the reference line 70, if the irradiating position 74 of the reflected light beam 48 to the target coincides with the objective position 72. For this reason, since the subjective portion 58 can be controlled not so as to exceed the reference line 70 by setting the distance L1 as more than one half of the distance L2, the deviating range from the reference line of the front end in the head portion becomes smaller and the straight advancing property of the excavating machine is more improved, in comparison with those in case where the distance L1 is less than one half of the distance L2. However, even though the distance L1 may be less than one half of the distance L2, the zigzag frequency of the excavating machine becomes less and the deviating range from the reference line of the excavating machine becomes also smaller in comparison with the direction controlling method and apparatus known per se.

In case where the distance L1 is one half of the distance L2 under the condition shown in FIG. 2, the subjective portion 58 coincides with the reference line 70, if the irradiating position 74 coincides with the objective position 72. However, in case where the distance L1 exceeds one half of the distance L2, the subjective portion 58 does not coincide with the reference line 70, even though the irradiating position 74 coincides with the objective position 72. For this reason, if the distance L1 is assumed as one half of the distance L2, the deviating range from the reference line of the top end of the head portion becomes smaller in comparison with that in case where the distance L1 exceeds one half of the distance L2.

As described above, if the direction of the head portion to the tail portion is corrected so as to angularly rotate the head portion to the direction corresponding to the displacement direction of the irradiating position 74 to the objective position 72 from the present point with respect to the tail portion, the direction of the head portion to the tail portion may be corrected so that the irradiating position 74 may approach the objective position 72 or that the irradiating position 74 may not shift from the objective position 72 when the irradiating position 74 has shifted from the objective position 72 or when the irradiating position 74 is about to shift from the objective position 72. Consequently, the operation for the directional control is easier in comparison with that in the directional control techniques known per se.

In the method and apparatus for the directional control of the present invention, the direction of the head portion to the tail portion can be always corrected so as to allow the subjective portion 58 to direct to the reference line 70, in case where the axis of the excavating machine coincides with the reference line. On the other hand, in the directional control techniques known per se, the direction of the head portion to the tail portion is often corrected in a direction where the front end of the head portion is apart from the reference line, that is, so that the portion corresponding to the subjective portion 58 may exceed the reference line, in case where the axis of the excavating machine coincides with the reference line. Consequently, according to the directional control method and apparatus of the present invention, the zigzag frequency per unit distance is lower and the deviating range from the reference line is smaller in comparison with those in the directional control technique known per se.

If the reflector 46 is disposed so that the line 76 at the irradiating position of the light beam 40 to the reflector 46 may extend in parallel with an imaginary line connecting the subjective portion 58 with the center point 20 of the bend, in other words, that the reflecting plane may make a right angle with an imaginary line connecting the subjective portion 58 with the center point 20 of the bend, the operation for the directional control becomes easy by setting the irradiating position 74 of the reflected light beam to the target as the objective position 72 when the subjective portion 58 is substantially available on the reference line 70. The reflector may, however, not always be disposed as described above.

The reflector 46 may be disposed as being shifted to the outside in the radial direction of the excavating machine 10 instead of disposing the reflector 46 so as to allow a center thereof to coincide with the axis 18, so that the light beam 40 directed to the reference line 70 may be directly incident on the reflector 46.

A direction controlling apparatus shown in FIG. 3 further comprises a deflector 60 for altering the optical path of the light beam 40. The deflector 60 is provided with a first deflecting mirror 62 for deflecting light beam 40 directed to the reference line to the outside in the radial direction of the tail portion and a second deflecting mirror 64 for directing the deflected light beam in parallel with the reference line.

The reflector 46 in the preferred embodiment shown in FIG. 3 is shifted to the outside in the radial direction of the tail portion 16 so as to receive the light beam deflected by the second deflecting mirror 64. In addition, the target 50 is shifted to the outside in the radial direction of the tail portion 16 so that the light beam deflected by the second deflecting mirror 64 may pass through the transparent portion 50a and that the reflected light beam 48 may be irradiated at the light-receiving portion 50b.

If the excavating machine 10 is advanced at a right position and in a right attitude relative to the reference line also in the case of the apparatus shown in FIG. 3, the light beam 40 is directed to the axis 18, passes through a predetermined portion of the transparent portion 50a in the target 50 and reaches the reflector 46, and the reflected light beam 48 is irradiated at the objective position of the light-receiving portion 50b in the target 50. Also, even though the head portion 14 may be inclined to the tail portion 16, the reflected light beam 48 is irradiated at the objective position of the light-receiving portion 50b when the subjective portion 58 is available on the reference line.

However, since the reflected light beam 48 is irradiated at a place apart from the objective position of the light-receiving portion 50b, when the subjective portion deviates from the reference line, it can be known that the subjective portion 58 has been apart from the reference line, and the operator can control the jack 22 so that the reflected light beam 48 may be irradiated at the objective position of the light-receiving portion 50b. Accordingly, the excavating machine 10 is controlled so as to advance at a right position and in a right attitude relative to the reference line.

According to the apparatus shown in FIG. 3, the light beam 40 directed to the axis 18 takes a circuitous route due to a hindrance 86, and therefore, the space within the tail portion 16 can be effectively used. Also in case of the apparatus shown in FIG. 3, it is preferable to arrange the target 50 so that the distance L1 may become more than one half of the distance L2 when the excavating machine is disposed at a right position and in a right attitude relative to the reference line.

A direction controlling apparatus shown in FIG. 4 comprises another deflector 80 for altering the optical path of the light beam 40. The deflector 80 is provided with a first deflecting mirror 82 for deflecting the light beam 40 directed to the reference line to the outside in the radial direction of the tail portion 16, a semitransparent mirror 84 for permitting the passage of the deflected light beam, and a second deflecting mirror 86 for causing the light beam passed through the semitransparent mirror to direct in parallel with the axis 18, and the deflector 80 is mounted on the tail portion 16 by means of a bracket 88.

The second deflecting mirror 86 is disposed so as to cause the light beam passed through the semitransparent mirror 84 to direct toward the reflector 46 and also to cause the reflected light beam 48 to direct toward the semitransparent mirror 84. The semitransparent mirror 84 allows the light beam deflected by the first deflecting mirror 82 to pass through itself in the direction of the second deflecting mirror 86, and also allows the reflected light beam 48 deflected by the second deflecting mirror 86 to direct toward the target 50. The television camera 52 is disposed so as to take a picture of the overall target from the rear thereof.

If the excavating machine 10 is advanced at a right position and in a right attitude relative to the reference line also in case of the apparatus shown in FIG. 4, the light beam 40 is directed to the axis 18, passes through a predetermined portion of the transparent portion 50a in the target 50 and reaches the reflector 80, and the reflected light beam 48 passes through the reflector 80 and is irradiated at the objective position of the light-receiving portion 50b in the target 50. Also, even though the head portion 14 may be inclined to the tail portion 16, the reflected light beam 48 is irradiated at the objective position of the light-receiving portion 50b, when the subjective portion 58 is available on the reference line.

However, since the reflected light beam 48 is irradiated at a place apart from the objective position of the light-receiving portion 50b, when the subjective portion 58 deviates from the reference line, it can be known that the subjective portion 58 has been apart from the reference line, and the operator can control the jack 22 so that the reflected light beam 48 may be irradiated at the objective position of the light-receiving portion 50b. Accordingly, the excavating machine 10 is controlled so as to advance at a right position and in a right attitude relative to the reference line.

According to the apparatus shown in FIG. 4, since the light beam 40 can avoid any influences by a hindrance or obstruction such as the rotary mechanism 32 and the reflector 46 can approach the subjective portion 58, the distance from the subjective portion 58 to the reflector 46 can be shortened and consequently this enhances the precision in the direction control.

In case of the apparatus shown in FIG. 4, it is preferable to dispose the target 50 so as to set the distance L1 between the reflector 46 in parallel with a vertical line 76 in the light-irradiating portion of the reflector 46 and the objective position 72 (this is virtually an optical path length of the reflected light beam 48) to be more than one half of the distance L2 when the excavating machine is disposed at a right position and in a right attitude relative to the reference line. In this case, the optical path length L1 of the reflected light beam 48 can be obtained as a sum of the distance, that is, a distance between the reflector 46 and the second deflecting mirror 86, a distance between the second deflecting mirror 86 and the semitransparent mirror 84, and a distance between the semitransparent mirror 84 and the target 50.

What is claimed is:

1. A method for controlling the direction of an excavating machine, comprising the steps of:
providing an excavating machine which includes a shield body provided with a head portion and a tail portion flexibly connected to the rear of the head portion and means for correcting the direction of said head portion relative to said tail portion;
directing a light beam toward said excavating machine along an imaginary reference line from the rear of said excavating machine;
receiving said light beam on a reflector mounted on said head portion;
receiving a reflected light beam from said reflector on a target mounted on said tail portion; and
controlling said correcting means such that said reflected light beam is irradiated at an objective position within said target.

2. A method for controlling the direction of an excavating machine according to claim 1, wherein said objective position is an irradiating position within said target to which the reflected light beam is irradiated when a predetermined subjective portion at a front end of said head portion is substantially disposed on said reference line.

3. A method for controlling the direction of an excavating machine according to claim 2, wherein said subjective portion is substantially disposed on said reference line when said excavating machine is disposed at a right position and in a right attitude relative to said reference line.

4. A method for controlling the direction of an excavating machine according to claim 1, wherein said head portion and said tail portion are flexibly connected to each other as being centered around a center point, and said target is disposed at a position where the distance from said reflector to said objective position is a value corresponding to at least one half of the distance from the intersection point of said reference line with said front end of said excavating machine to said center point when said excavating machine to said center point when said excavating machine is disposed at a right position and in a right attitude relative to said reference line.

5. A method for controlling the direction of an excavating machine according to claim 4, wherein the distance from said reflector to said objective position is a value corresponding to one half of the distance from the intersection point of said reference line with said front end of said excavating machine to said center point when said excavating machine is disposed at a right position and in a right attitude relative to said reference line.

6. An apparatus for controlling the direction of an excavating machine comprising a shield body provided with a head portion and a tail portion flexibly connected to the rear of the head portion and means for correcting the direction of said head portion relative to said tail portion;
a reflector mounted on said head portion to receive a light beam directed to said shield body along an imaginary reference line from the rear of said shield body; and
a target mounted on said tail portion to receive a reflected light beam from said reflector.

7. An apparatus for controlling the direction of an excavating machine according to claim 6, wherein said target has an objective position which is an irradiating position within said target to which the reflected light beam is irradiated when a subjective portion for the advancement predetermined at a front end of said head portion is substantially disposed on said reference line.

8. An apparatus for controlling the direction of an excavating machine according to claim 7, wherein said subjective portion is substantially disposed on said reference line when said excavating machine is disposed at a right position and in a right attitude relative to said reference line.

9. An apparatus for controlling the direction of an excavating machine according to claim 8, wherein said target is provided with a semitransparent light-transmitting portion for permitting the passage of the light beam directed to said reflector and a light-receiving portion for receiving the reflected light beam from said reflector.

10. An apparatus for controlling the direction of an excavating machine according to claim 7, wherein said target is provided with a semitransparent light-transmitting portion for permitting the passage of the light beam directed to said reflector and a light-receiving portion for receiving the reflected light beam from said reflector.

11. An apparatus for controlling the direction of an excavating machine according to claim 6, further comprising a deflector for causing a light beam directed along said reference line to direct along an optical path shifted from said reference line and toward said reflector.

12. An apparatus for controlling the direction of an excavating machine according to claim 11, wherein said target is provided with a semitransparent light-transmitting portion for permitting the passage of the light beam directed to said reflector and a light-receiving portion for receiving the reflected light beam from said reflector.

13. An apparatus for controlling the direction of an excavating machine according to claim 6, further comprising a deflector for causing a light beam directed along said reference line to the outside in the radial direction of said shield body, directing the deflected light beam to said reflector, directing the reflected light beam from said reflector to the center in the radial direction of said shield body, and directing the light beam directed to said center in the radial direction to said target.

14. An apparatus for controlling the direction of an excavating machine according to claim 13, wherein said target is provided with a semitransparent light-transmitting portion for permitting the passage of the light beam directed to said reflector and a light-receiving portion for receiving the reflected light beam from said reflector.

15. An apparatus for controlling the direction of an excavating machine according to claim 6, wherein said target is provided with a semitransparent light-transmitting portion for permitting the passage of the light beam directed to said reflector and a light-receiving portion for receiving the reflected light beam from said reflector.

16. An apparatus for controlling the direction of an excavating machine according to claim 6, further comprising a television camera for monitoring an image including said target and an area adjacent said target.

17. An apparatus for controlling the direction of an excavating machine according to claim 6, wherein said head portion and said tail portion are flexibly connected to each other as being centered around a center point, and said target is provided at a position where the distance from said reflector to said objective position is a value corresponding to at least one half of the distance from the intersection point of said reference line with said front end of said excavating machine to said center point when said excavating machine is disposed at a right position and in a right attitude relative to said reference line.

18. An apparatus for controlling the direction of an excavating machine according to claim 17, wherein said distance from said reflector to said objective position is a value corresponding to one half of the distance from the intersection point of said reference line with said front end of said excavating machine to said center point when said excavating machine is disposed at a right position and in a right attitude relative to said reference line.

* * * * *

UNITED STATES PATENT AND TRADEMARK OFFICE
CERTIFICATE OF CORRECTION

PATENT NO. : 5,296,915
DATED : March 22, 1994
INVENTOR(S) : Toshio Akesaka

It is certified that error appears in the above-indentified patent and that said Letters Patent is hereby corrected as shown below:

Column 3 Line 39 "right- position" should read --right position--.

Column 11 Line 62 delete "of the bend" and insert --of motion of the head portion 14 with respect to the tail portion 16--.

Column 11 Lines 64-65 delete "of the bend" and insert --of motion of the head portion 14 with respect to the tail portion 16--.

Column 12 Line 38 "50b." should read --50b,--.

Claim 4 Lines 37-38 Column 14 delete "to said center point of when said excavating machine".

Claim 6 Line 51 Column 14 "comprising" should read --comprising:--.

Claim 13 Line 37 Column 15 "causing" should read --deflecting--.

Signed and Sealed this

Twenty-sixth Day of July, 1994

Attest:

BRUCE LEHMAN

Attesting Officer

Commissioner of Patents and Trademarks